United States Patent
Ebner et al.

(10) Patent No.: US 10,151,224 B2
(45) Date of Patent: Dec. 11, 2018

(54) THERMOSTAT AND COMPONENT OF AN OIL CIRCUIT

(71) Applicant: Bayerische Motoren Werke Aktiengesellschaft, Munich (DE)

(72) Inventors: Joachim Ebner, Munich (DE); Bernhard Huber, Munich (DE); Dennis Thamm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 195 days.

(21) Appl. No.: 14/996,687

(22) Filed: Jan. 15, 2016

(65) Prior Publication Data

US 2016/0130993 A1 May 12, 2016

Related U.S. Application Data

(63) Continuation of application No. PCT/EP2014/064274, filed on Jul. 4, 2014.

(30) Foreign Application Priority Data

Jul. 18, 2013 (DE) .................. 10 2013 214 117

(51) Int. Cl.
*G05D 23/02* (2006.01)
*F01M 5/00* (2006.01)
(Continued)

(52) U.S. Cl.
CPC ........... *F01M 5/007* (2013.01); *F16K 31/002* (2013.01); *G05D 23/022* (2013.01); *F01P 2025/40* (2013.01); *G05D 23/1852* (2013.01)

(58) Field of Classification Search
CPC ................. G05D 23/022; G05D 23/1852
See application file for complete search history.

(56) References Cited

U.S. PATENT DOCUMENTS 4,386,584 A * 6/1983 Calkins ............... G05D 23/022
123/41.08
4,981,260 A * 1/1991 Beiser ..................... F01P 11/16
137/74

(Continued)

FOREIGN PATENT DOCUMENTS

DE        24 28 511 A1    1/1976
DE       100 55 987 A1    5/2002
(Continued)

OTHER PUBLICATIONS

International Search Report (PCT/ISA/210) issued in PCT Application No. PCT/EP2014/064274 dated Mar. 5, 2015 with English translation (eight pages).

(Continued)

*Primary Examiner* — Jonathan Bradford
(74) *Attorney, Agent, or Firm* — Crowell & Moring LLP

(57) ABSTRACT

A thermostat includes a carrier element which can be anchored in a housing, and a valve element which is movable relative to the carrier element. The valve element contacts the carrier element in a first position, whereby a duct within the housing can be closed. In a second position, which differs from the first position, the valve element does not contact the carrier element, whereby the duct can be opened. A wax element is arranged on the carrier element and is mechanically connected to the valve element. The wax element is configured to generate a stroke in case of a temperature change, by which the valve element can be moved.

20 Claims, 2 Drawing Sheets

(51) Int. Cl.
*F16K 31/00* (2006.01)
*G05D 23/185* (2006.01)

(56) References Cited

U.S. PATENT DOCUMENTS

| | | | | |
|---|---|---|---|---|
| 5,791,557 | A * | 8/1998 | Kunze | F16H 57/0413 |
| | | | | 236/34.5 |
| 8,066,198 | B2 * | 11/2011 | Palanchon | G05D 23/1333 |
| | | | | 236/100 |
| 2002/0053325 | A1 | 5/2002 | Fishman et al. | |
| 2006/0006247 | A1 | 1/2006 | Roman et al. | |
| 2010/0032490 | A1 | 2/2010 | Mabboux | |
| 2010/0181516 | A1 | 7/2010 | Palanchon et al. | |
| 2012/0211216 | A1 * | 8/2012 | Noonchester | F01M 5/007 |
| | | | | 165/271 |

FOREIGN PATENT DOCUMENTS

| | | |
|---|---|---|
| DE | 60 2004 004 250 T2 | 11/2007 |
| DE | 10 2011 077 901 A1 | 12/2012 |
| WO | WO 98/48333 A1 | 10/1998 |

OTHER PUBLICATIONS

German Search Report issued in counterpart German Application No. 10 2013 214 117.3 dated Feb. 18, 2014 with partial English translation (seven pages).
German-language Written Opinion (PCT/ISA/237) issued in PCT Application No. PCT/EP2014/064274 dated Mar. 5, 2015 (eight pages).

* cited by examiner

THERMOSTAT AND COMPONENT OF AN OIL CIRCUIT

CROSS REFERENCE TO RELATED APPLICATIONS

This application is a continuation of PCT International Application No. PCT/EP2014/064274, filed Jul. 4, 2014, which claims priority under 35 U.S.C. § 119 from German Patent Application No. 10 2013 214 117.3, filed Jul. 18, 2013, the entire disclosures of which are herein expressly incorporated by reference.

BACKGROUND AND SUMMARY OF THE INVENTION

The invention relates to a thermostat which preferably regulates a bypass of a cooler. Furthermore, the invention relates to a component of an oil circuit, it being, in particular, the oil circuit of a vehicle. The thermostat also preferably serves to regulate a bypass of an oil cooler of the vehicle.

It is known from the prior art that internal combustion engines have an oil circuit, in order to make reliable and low-consumption operation of the internal combustion engine possible. The oil circuit usually also includes an oil cooler which cools the circulating oil with the aid of a cooling liquid, which cooling liquid is provided for cooling the internal combustion engine.

The cooling liquid usually heats up more rapidly than the oil during the warming up operation of the engine. Warming of the oil by way of the cooling liquid is therefore possible during warm up. In order for it to be possible to lower the pressure loss in the system, a constant bypass is provided.

However, the constant bypass can neither make the warming up optimum nor can the complete potential of the oil cooler be exploited in the cooling output case, since the oil is never guided completely via the oil cooler. Furthermore, the temperature of the oil is likewise coupled in a pronounced manner to the temperature of the cooling liquid. In particular during dynamic driving operation, that is to say frequent changing from operation under load of the internal combustion engine into an overrun mode, this can lead to overcooling of the oil, as a result of which the friction within the internal combustion engine increases and the fuel consumption rises.

It is therefore an object of the invention to eliminate these disadvantages. In particular, it is an object of the invention to provide components which permit secure and reliable regulation of the temperature of a circulating fluid, while being simple and inexpensive to produce and operating with low-maintenance.

This and other objects are achieved by a thermostat including a carrier element which can be anchored in a housing, and a valve element which can be moved relative to the carrier element. The valve element bears against the carrier element in a first position, as a result of which a duct within the housing can be closed, and does not bear against the carrier element in a second position which is different than the first position, as a result of which the duct can be opened. The thermostat includes a wax element which is arranged on the carrier element, is connected mechanically to the valve element and is set up to generate a stroke in the case of a temperature change, by way of which stroke the valve element can be moved.

According to an embodiment of the invention, a thermostat includes a carrier element, it being possible for the carrier element to be anchored in a housing. It is possible in this way, in particular, that the carrier element of the thermostat is attached in a bypass of a cooler, preferably an oil cooler. Furthermore, the thermostat includes a valve element which can be moved relative to the carrier element. It is provided here according to the invention that the valve element can be transferred into a first position, in which the valve element bears against the carrier element. A duct, preferably the bypass, can be closed by way of the valve element bearing against the carrier element. It is likewise provided according to the invention that there is a second position of the valve element, which second position differs from the first position and in which the duct can be opened. To this end, the valve element no longer bears against the carrier element in the second position.

Furthermore, the thermostat includes a wax element which is set up to generate a stroke in the case of a temperature change. In particular, the stroke can be produced by way of expansion or contraction of the wax element. The wax element is arranged on the carrier element and is connected mechanically to the valve element. The wax element therefore transfers the stroke to the valve element, as a result of which a relative movement is produced between the valve element and the carrier element.

In one preferred embodiment, the thermostat has a first elastic element. The first elastic element exerts a force on the valve element, by way of which the valve element is forced into the first position, in particular when the valve element is not situated in the first position. It is provided as an alternative or in addition that the valve element is pressed against the carrier element by way of the force of the first elastic element, in particular when the valve element is situated in the first position. Sealing of the duct can preferably be ensured by way of the valve element being pressed onto the carrier element.

It is particularly preferably provided that the first elastic element is set up in such a way that a predefined pressure on the valve element moves the valve element out of the first position. The duct can therefore be opened by way of the predefined pressure. It is advantageously made possible in this way that, in the case of an excessively high pressure, a fluid can escape into the duct, with the result that the thermostat can also be used as a pressure relief valve.

The valve element is advantageously constructed such that it has a first convex surface. The first convex surface preferably seals the first opening of the carrier element when the valve element is situated in the first position. The sealing of the first opening preferably also means closure of the duct.

In a further preferred embodiment of the thermostat, the valve element can be moved linearly. It is preferably provided here that the valve element can be moved linearly away from the carrier element and can be moved linearly toward the carrier element. In this way, in particular, a linear stroke of the wax element can be converted directly into a linear movement of the valve element.

Moreover, it is preferably provided that the valve element bears against the carrier element and/or against the housing in a third position and thus closes the duct. The third position is different from the first and second positions. The transfer of the valve element into the third position preferably always takes place via the second position, with the result that a transfer of the valve element from the first position into the third position and vice versa while bypassing the second position is not possible.

The valve element advantageously has a second convex surface which seals a second opening of the carrier element and/or of the housing in the third position. The second surface is preferably of identical configuration to the first surface.

In one preferred embodiment, the valve element can be moved linearly from the first position into the third position, the second position being any intermediate position between the first and the third position. A linear stroke of the wax element is therefore preferably converted into a linear movement of the valve element, the duct first of all being opened and subsequently being closed again by way of the valve element as the stroke increases.

Moreover, it is preferably provided that the thermostat has a second elastic element. The second elastic element is arranged between the carrier element and the wax element and serves particularly preferably as a compensation element. It is therefore possible that a stroke of the wax element brings about a movement of the valve element and, as an alternative or in addition, a contraction or expansion of the second elastic element. It is therefore possible, in particular, that a stroke of the wax element can be carried out even when the valve element can no longer be moved, which occurs, in particular, when the valve element is situated in the third position.

Furthermore, the invention relates to a component of an oil circuit, in particular an oil circuit in a vehicle. The component according to the invention includes a thermostat as described above and a housing, in which the thermostat is arranged. The housing has an oil inlet and a first oil outlet, the wax element being arranged in such a way that oil which flows from the oil inlet to the first oil outlet washes around the wax element. Furthermore, a second oil outlet can be opened and closed by way of the valve element, the second oil outlet forming the start of the duct. This means that the thermostat can be used to control, within the component, whether oil which enters through the oil inlet is to be guided through the first oil outlet or, preferably, through the second oil outlet.

The component according to the invention is preferably configured in such a way that the first oil outlet is connected to an oil cooler and the duct forms a bypass of the oil cooler. The oil can therefore either pass through the first oil outlet into the oil cooler or can be guided past the oil cooler through the second oil outlet. It is possible to regulate the temperature of the oil in this way.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
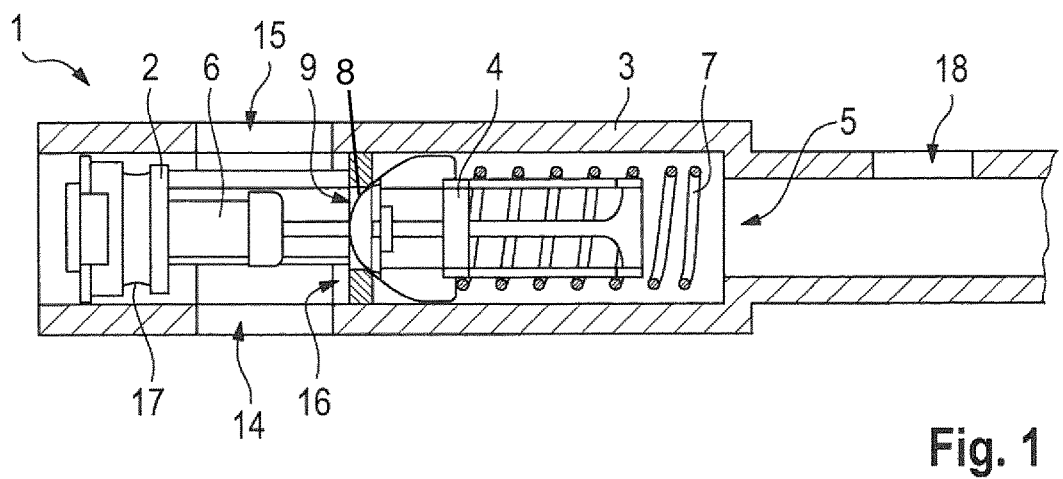
FIG. 1 is a first diagrammatic cross section view of the thermostat according to a first exemplary embodiment of the invention within a housing.
Figure 2:
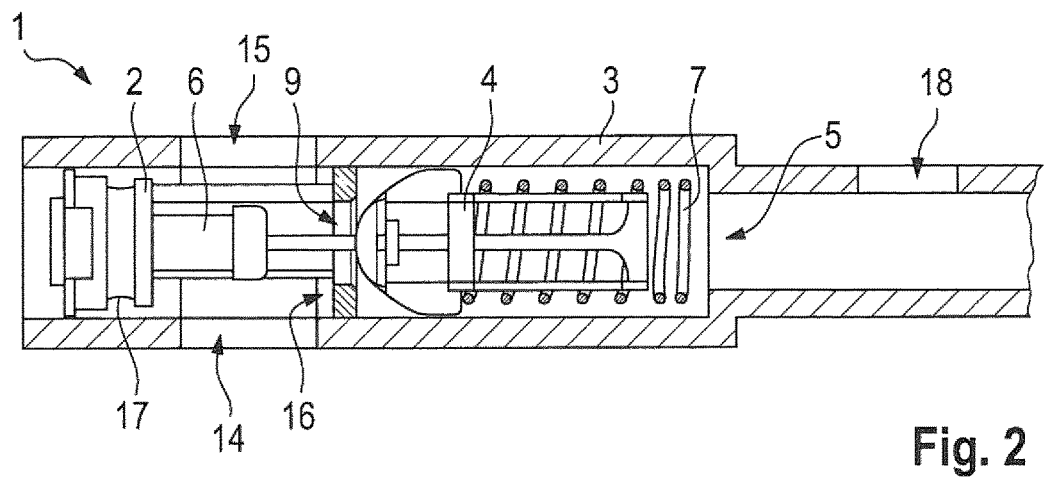
FIG. 2 is a second diagrammatic cross section view of the thermostat according to the first exemplary embodiment of the invention within a housing.

FIGS. 1 and 2 show diagrammatic views of a first exemplary embodiment of the invention. In each case one thermostat 1 is shown, which is shown in a housing 3 for improved understanding.

The thermostat 1 includes a carrier element 2 which is anchored in the housing 3. The carrier element 2 preferably has a seal region 17 for receiving a seal, by way of which the carrier element 2 can be sealed with respect to the housing 3, with the result that an escape of fluid from the housing 3 is avoided. The carrier element 2 has the shape of a hollow cylinder, the circumferential face of which in turn has openings, with the result that fluid can penetrate into the interior of the hollow cylinder. A wax element 6 is fastened to the carrier element 2. The wax element is arranged, in particular, in the interior of the hollow cylinder.

The wax element 6 is connected mechanically to a valve element 4. The valve element 4 can be moved relative to the carrier element, an exclusive movement direction of the valve element 4 being parallel to a longitudinal axis or axis of symmetry of the hollow cylinder. In a first position, the valve element 4 bears against the carrier element 2. This case is shown in FIG. 1. In a second position, the valve element 4 does not bear against the carrier element 2. This case is shown in FIG. 2.

FIG. 1 shows the valve element 4 in the first position. The valve element 4 therefore bears against the carrier element 2, in order to close the duct 5. To this end, the valve element 4 has a first convex surface 8 which closes a first opening 9 of the carrier element 2. In this way, a fluid cannot penetrate into the duct 5. A first elastic element 7 presses the first convex surface 8 into the first opening 9, with the result that a sealing action takes place. The first elastic element 7 is preferably a spiral spring.

In order to open the duct 5, the valve element 4 has to be displaced counter to the restoring force of the first elastic element 7 out of the first position into the second position. This can take place in two ways: firstly, it is possible that the wax element 6 generates a stroke which is sufficient to displace the valve element 4; secondly, it is possible that a fluid generates a pressure which is such that the restoring force of the first elastic element 7 is overcome. In both cases, fluid can flow through the first opening 9 and can therefore pass into the duct 5.

According to the first exemplary embodiment, the thermostat 1 is a regulating element for opening and closing a duct 5 which forms a bypass of an oil cooler. The housing 3 therefore has an oil inlet 14, into which an oil can be introduced, and a first oil outlet 15, from which the oil can be removed. The carrier element 2 of the thermostat 1 is advantageously arranged within the housing 3 in such a way that a flow around the wax element 6 takes place when the oil within the housing flows from the oil inlet 14 to the first oil outlet 15. The temperature of the wax element 6 therefore equalizes with the temperature of the oil, with the result that a stroke of the wax element 6 is generated in the case of a change in the temperature of the oil. The thermostat 1 can therefore regulate the degree of opening of the duct 5 which acts as a bypass using the temperature of the oil.

Figure 3:
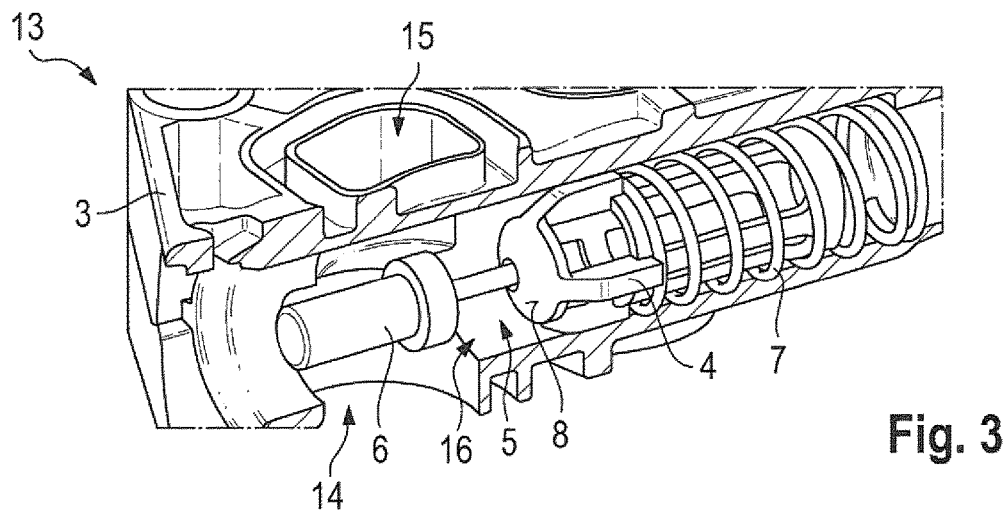
FIG. 3 is a diagrammatic perspective view of the component according to one exemplary embodiment of the invention.

FIG. 3 shows a diagrammatic view of the component of an oil circuit according to one exemplary embodiment of the invention. Here, the carrier element 2 of the thermostat 1 has not been shown for the sake of clarity.

It is clear from this that the first oil outlet 15 can be connected to an oil cooler, the oil cooler discharging the received oil again via a return 18. The duct 5 therefore extends as a bypass from the oil inlet 14 to the return. The oil which passes through the oil inlet 14 can therefore either be guided via the first oil outlet 15 to the oil cooler, or via a second oil outlet 16 to the duct 5, in order to bypass the oil cooler. The second oil outlet 16 is formed by the first opening 9 of the carrier element 2 and can therefore be closed and opened.

The thermostat 1 according to the invention in accordance with the first embodiment is therefore set up to divide an oil flow between the oil cooler and the bypass of the oil cooler. Here, the bypass is closed at low temperatures of the oil, in order to use the coolant which heats up more rapidly by way of the internal combustion engine in order to heat the oil. In this case, the oil cooler does not cool the oil, but rather heats it. An operating temperature of the oil can therefore be reached very rapidly.

As soon as the oil has reached the operating temperature, it is to be kept at that temperature. Further coupling to the temperature profile of the coolant is therefore not appropriate. The thermostat 1 according to the first exemplary embodiment takes account of this fact, by the wax element 6 transferring the valve element 4 into the second position as a result of the generation of a stroke and therefore opening the first opening 9. Oil can flow through the duct 5 and therefore bypass the oil cooler. As a result, the oil temperature is for the greatest part decoupled from the temperature of the coolant.

Figure 4:
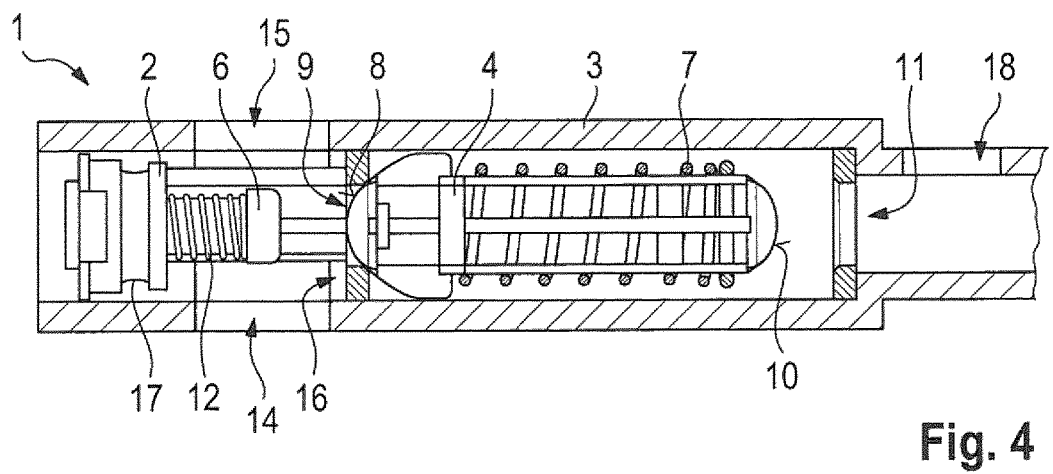
FIG. 4 is a first diagrammatic cross section view of the thermostat according to a second exemplary embodiment of the invention within a housing.
Figure 5:
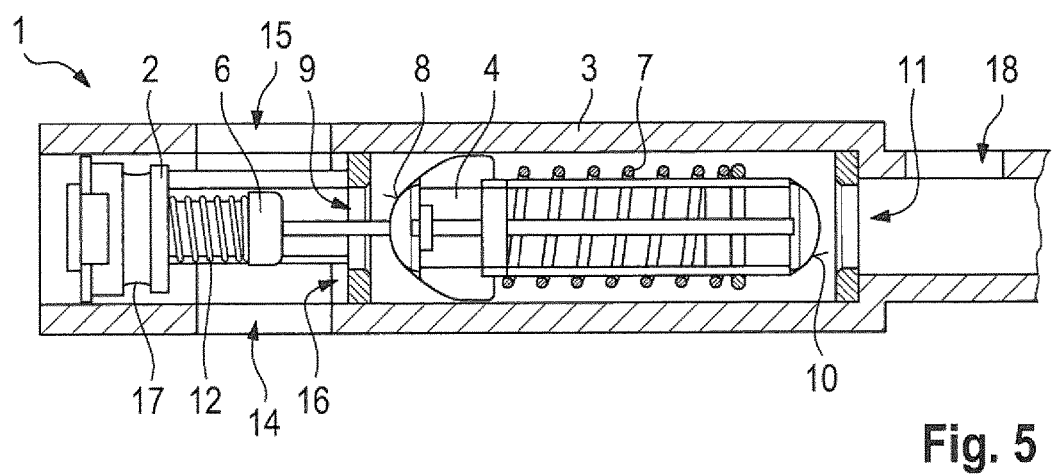
FIG. 5 is a second diagrammatic cross section view of the thermostat according to the second exemplary embodiment of the invention within a housing.
Figure 6:
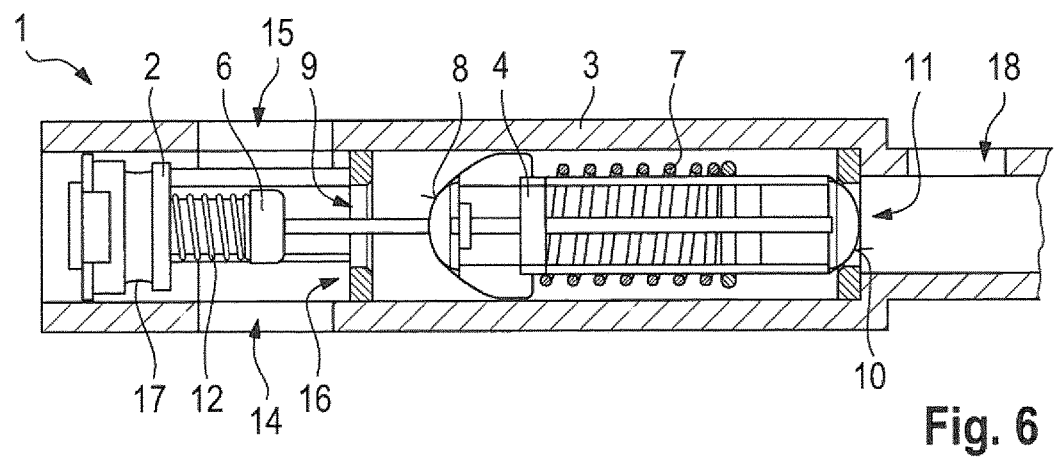
FIG. 6 is a third diagrammatic cross section view of the thermostat according to the second exemplary embodiment of the invention within a housing.

FIGS. 4 to 6 show the thermostat 1 according to a second exemplary embodiment of the invention. Here, identical designations have been used for identical or similar components.

The second embodiment is identical to the first embodiment, the following elements being added: the valve element 4 of the thermostat 1 of the second exemplary embodiment has a second convex surface 10. The second convex surface 10 is set up to close a second opening 11. The second opening is either a part region of the carrier element 2 or a part region of the housing 3. A third position therefore exists for the valve element 4, in which third position the second opening 11 is closed by way of the second convex surface 10. The closure of the second opening 11 also means closure of the duct 5.

According to this exemplary embodiment, the valve element 4 can have three positions: the first position of the valve element 4 closes the duct 5. This is shown in FIG. 4, said position being identical to that position of the first exemplary embodiment which is shown in FIG. 1. The second position of the valve element 4 is shown in FIG. 5 and in an analogous manner to that case of the first exemplary embodiment which is shown in FIG. 2. The duct 5 is therefore open.

The third position of the valve element is shown in FIG. 6. Here, the first exemplary embodiment differs from the second exemplary embodiment, since the second exemplary embodiment shows that the duct 5 is closed at rising temperatures of the fluid which flows around the wax element 6. As soon as the wax element 6 generates a predefined stroke, the second convex surface 10 is pressed into the second opening 11, with the result that the duct 5 is closed.

In an analogous manner to the abovementioned application of the oil cooling, a maximum cooling output can be set in the third position. As was already the case in the first position, the duct 5 is closed and the entire oil flow is guided through the oil cooler. It can therefore be prevented that the temperature of the oil rises further.

Moreover, the thermostat 1 according to the second exemplary embodiment has a second elastic element 12. The second elastic element 12 is arranged between the carrier element 2 and the wax element 6, with the result that the second elastic element 12 can assume a compensating function. In particular, in the case where the valve element 4 is situated in the third position, a further movement of the valve element 4 is not possible. The second elastic element 12 therefore absorbs the remaining stroke of the wax element 6. In particular, the second elastic element 12 may be a spiral spring.

LIST OF DESIGNATIONS

1 Thermostat
2 Carrier element
3 Housing
4 Valve element
5 Duct
6 Wax element
7 First elastic element
8 First convex surface
9 First opening of the carrier element (concave surface)
10 Second convex surface
11 Second opening of the carrier element/of the housing (concave surface)
12 Second elastic element
13 Component
14 Oil inlet
15 First oil outlet
16 Second oil outlet
17 Seal region
18 Return The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermostat, comprising:
a carrier element anchorable in a housing;
a valve element movable relative to the carrier element, the valve element being configured to bear against the carrier element and close a first opening of the carrier element in a first position in which a duct within the housing is closable, and not bear against the carrier element in a second position, different from the first position, in which the duct is openable;
an elastic element that exerts a force on the valve element causing the valve element to bear against the carrier element; and
a wax element arranged on the carrier element, the wax element being connected mechanically to the valve element and being configured to generate a stroke based on a temperature change, the stroke causing movement of the valve element, the first opening located between the wax element and the elastic element.

2. The thermostat according to claim 1, wherein the elastic element is a first elastic element exerts the force on the valve element to press the valve element in a direction of the first position against the carrier element.

3. The thermostat according to claim 2, wherein the first elastic element is designed such that a pressure on the valve element overcoming a restoring force of the first elastic element moves the valve element out of the first position.

4. The thermostat according to claim 1, wherein the valve element has at least one first convex surface configured to seal the first opening of the carrier element in the first position.

5. The thermostat according to claim 3, wherein the valve element has at least one first convex surface configured to seal the first opening of the carrier element in the first position.

6. The thermostat according to claim 1, wherein the valve element is linearly movable.

7. The thermostat according to claim 6, wherein the valve element has at least one first convex surface configured to seal the first opening of the carrier element in the first position.

8. The thermostat according to claim 4, wherein the valve element is further configured such that, in a third position different from the first and second positions, the valve element bears against a seat in the housing in order to close the duct.

9. The thermostat according to claim 8, wherein the valve element has at least one second convex surface that seals a second opening, formed by the seat in the housing, in the third position.

10. The thermostat according to claim 8, wherein the valve element is linearly movable from the first position into the third position, and the second position is any intermediate position between the first and third positions.

11. The thermostat according to claim 9, wherein the valve element is linearly movable from the first position into the third position, and the second position is any intermediate position between the first and third positions.

12. The thermostat according to claim 2, further comprising a second elastic element arranged between the carrier element and the wax element.

13. The thermostat according to claim 3, further comprising a second elastic element arranged between the carrier element and the wax element.

14. The thermostat according to claim 1, wherein the carrier element is shaped as a hollow cylinder defining a circumferential face, the circumferential face having openings permitting fluid to penetrate into an interior of the hollow cylinder.

15. The thermostat according to claim 14, wherein the wax element is arranged in the interior of the hollow cylinder.

16. An oil circuit component of a vehicle, comprising:
a housing;
a thermostat arranged in the housing, the thermostat comprising:
a carrier element anchorable in the housing;
a valve element movable relative to the carrier element, the valve element being configured to bear against the carrier element and close a first opening of the carrier element in a first position in which a duct within the housing is closable and not bear against the carrier element in a second position, different from the first position, in which the duct is openable;
an elastic element that exerts a force on the valve element causing the valve element to bear against the carrier element; and
a wax element arranged on the carrier element, the wax element being connected mechanically to the valve element and being configured to generate a stroke based on a temperature change, the stroke causing movement of the valve element;
wherein the wax element is arranged between an oil inlet and a first oil outlet such that oil flows past the wax element, and
wherein a second oil outlet is formed into a beginning of the duct to be opened and closed by way of the valve element, the first opening located between the wax element and the elastic element.

17. The oil circuit component according to claim 16, further comprising:
an oil cooler, wherein the first oil outlet is connected to the oil cooler, and the duct forms a bypass of the oil cooler.

18. The oil circuit component according to claim 16, wherein the carrier element is shaped as a hollow cylinder defining a circumferential face, the circumferential face having openings permitting fluid to penetrate into an interior of the hollow cylinder.

19. The oil circuit component according to claim 18, wherein the wax element is arranged in the interior of the hollow cylinder.

20. The oil circuit component according to claim 17, wherein the carrier element is shaped as a hollow cylinder defining a circumferential face, the circumferential face having openings permitting fluid to penetrate into an interior of the hollow cylinder.

* * * * *